US010698687B1

United States Patent
Tan et al.

(10) Patent No.: US 10,698,687 B1
(45) Date of Patent: Jun. 30, 2020

(54) PIPELINED RESOURCE ALLOCATION USING SIZE ALIGNED ALLOCATION

(71) Applicant: Apple Inc., Cupertino, CA (US)

(72) Inventors: Dimitri Tan, Austin, TX (US); Jeffrey T. Brady, Orlando, FL (US); Terence M. Potter, Austin, TX (US); Jeffrey M. Broton, Chuluota, FL (US); Frank W. Liljeros, Sanford, FL (US)

(73) Assignee: Apple Inc., Cupertino, CA (US)

( * ) Notice: Subject to any disclaimer, the term of this patent is extended or adjusted under 35 U.S.C. 154(b) by 132 days.

(21) Appl. No.: 15/695,263

(22) Filed: Sep. 5, 2017

(51) Int. Cl.
*G06F 13/22* (2006.01)
*G06F 9/30* (2018.01)
*G06F 9/38* (2018.01)
*G06F 9/46* (2006.01)

(52) U.S. Cl.
CPC ........ *G06F 9/30079* (2013.01); *G06F 9/3867* (2013.01); *G06F 9/46* (2013.01)

(58) Field of Classification Search
CPC ....... G06F 9/30079; G06F 9/3867; G06F 9/46
USPC .......................................................... 712/220
See application file for complete search history.

(56) References Cited

U.S. PATENT DOCUMENTS

| | | | | |
|---|---|---|---|---|
| 5,930,829 | A * | 7/1999 | Little | G06F 12/023 711/104 |
| 6,088,777 | A * | 7/2000 | Sorber | G06F 12/023 370/381 |
| 8,015,385 | B2 | 9/2011 | Schopp | |
| 9,417,881 | B2 | 4/2016 | Jones | |
| 2005/0120195 | A1* | 6/2005 | Kumar | G06F 9/5016 712/245 |
| 2010/0023653 | A1* | 1/2010 | Rozen | G06F 13/1605 710/28 |
| 2017/0053374 | A1 | 2/2017 | Howes | |

* cited by examiner

*Primary Examiner* — Chun Kuan Lee
(74) *Attorney, Agent, or Firm* — Kowert, Hood, Munyon, Rankin & Goetzel, P.C.

(57) ABSTRACT

An example system includes a plurality of execution units, a shared resource, and an allocation control circuit. Each execution unit may generate a resource allocation request that includes a resource allocation size. The allocation control circuit may select a particular resource allocation request from the plurality of resource allocation requests, and determine an availability, based on an allocation register, of contiguous resource blocks within the shared resource. In response to determining that a number of the contiguous resource blocks satisfies a requested allocation size, the allocation control circuit may select an address corresponding to a particular resource block of the one or more contiguous resource blocks, and allocate the resource blocks to a corresponding execution unit. In response to a beginning of a second system clock cycle, the allocation control circuit may also update the allocation register based on the selected address and the requested allocation size.

20 Claims, 8 Drawing Sheets

PIPELINED RESOURCE ALLOCATION USING SIZE ALIGNED ALLOCATION

BACKGROUND

Technical Field

Embodiments described herein are related to the field of integrated circuit implementation, and more particularly to the implementation of resource allocation circuits.

Description of the Related Art

In a computing system, a resource allocation circuit may receive a plurality of allocation requests from one or more processor circuits. Allocation requests may be for resource blocks of varying sizes. When, for example, the resource is a memory or a bank of registers, the allocation may occur using consecutive addresses. Resource fragmentation can occur when only small groups of consecutively addressed resources remain available. This fragmentation can lead to a state in which further allocations cannot be made due to a lack of availability of a suitably large block of consecutive resources. Resource allocation may be stuck until execution circuits complete use of their current allocations and then release the allocated resources.

In some computing systems, a speed of performing the memory allocations may be a factor affecting the performance of the computing system. Allocation solutions that require several processing cycles to complete may have a negative impact to system performance. For example, in graphics processing, delayed memory allocations may delay processing of a portion of an image to be displayed, thereby causing a noticeable image freeze or an improperly rendered image to be displayed.

SUMMARY OF THE EMBODIMENTS

Various embodiments are disclosed. Broadly speaking, a system, an apparatus, and a method are contemplated in which an embodiment of the system includes a plurality of execution units, a shared resource, and an allocation control circuit that includes an allocation register. The plurality of execution units may be configured to generate a plurality of resource allocation requests. The plurality of resource allocation requests may include a respective number indicating a resource allocation size. The allocation control circuit may be configured to, in response to a beginning of a first system clock cycle, select a particular resource allocation request from the plurality of resource allocation requests, and to determine an availability, based on a value stored in the allocation register, of one or more contiguous resource blocks within the shared resource. In response to determining that a number of the one or more contiguous resource blocks satisfies a requested number of resource blocks, the allocation control circuit may also be configured to select, based on the requested number, an address corresponding to a particular resource block of the one or more contiguous resource blocks, and to allocate the requested number of resource blocks, beginning at the selected address, to a corresponding execution unit of the plurality of execution units. In response to a beginning of a second system clock cycle, the allocation control circuit may also be configured to update the value stored in the allocation register based on the selected address and the requested number of resource blocks.

An embodiment of the method comprises, in response to a beginning of a first system clock cycle, selecting, by an allocation control circuit, one or more resource allocation requests generated by at least one corresponding execution unit of a plurality of execution units, and determining an availability, based on a value stored in an allocation register, of one or more contiguous resource blocks within a shared resource. In response to determining that a number of the one or more contiguous resource blocks satisfies a respective requested number of resource blocks for each of the one or more resource allocation requests, the method further comprises selecting, based on the requested number, a respective address of a particular resource block of the one or more contiguous resource blocks, and allocating the respective requested number of resource blocks, beginning at the selected respective address, to the corresponding execution unit of the plurality of execution units. In response to a beginning of a second system clock cycle, the method further comprises updating the value of the allocation register based on the selected respective address and the respective requested number of resource blocks.

One embodiment of the apparatus includes a token buffer configured to receive one or more tokens from a plurality of graphics processing circuits, an allocation register, and a control circuit. The one or more tokens may include a respective number indicative of a resource allocation size. The control circuit may be configured to, in response to a beginning of a first system clock cycle, select a particular token from the one or more tokens. The particular token may include a number indicating a size of a requested resource block. The control circuit may be further configured to determine an availability, based on a value stored in the allocation register, of one or more contiguous resource blocks within a shared resource. In response to determining that the one or more contiguous resource blocks satisfies the resource allocation size, the control circuit may also be configured to select, based on the resource allocation size, an address corresponding to a particular resource block of the one or more contiguous resource blocks, and to allocate a number of resources blocks corresponding to the resource allocation size, beginning at the selected address, to the particular token. In response to a beginning of a second system clock cycle, the control circuit may be configured to update the value of the allocation register based on the selected address and the resource allocation size.

BRIEF DESCRIPTION OF THE DRAWINGS

The following detailed description makes reference to the accompanying drawings, which are now briefly described.

Figure 1:
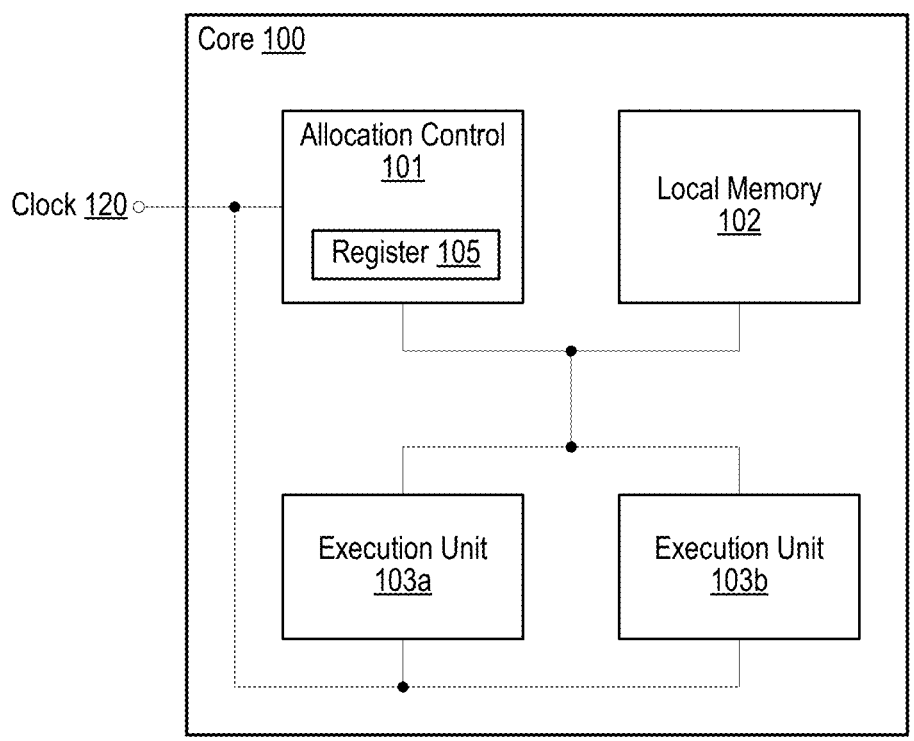
FIG. 1 illustrates a block diagram of an embodiment of a processor core.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

A processor circuit may require one or more shared resources to complete a task. Prior to starting the task, the processor circuit may issue allocation requests for any shared resources to be used in the completion of the task. In some embodiments, the processor circuit may be restricted from starting the task until all resources have been identified and allocated to the processor core for the duration of the task. A resource allocation circuit may receive the allocation requests from the processor circuit and allocate suitable resources based on the availability of the resource.

As used herein, "resource allocation" refers to a process of temporarily assigning a shared resource, or a portion of a shared resource, to a particular processor circuit, providing the particular processor circuit resources to complete a task. Furthermore, as used herein, a "shared resource" refers to any circuit with limited access that may be shared by two or more processor circuits. A shared resource may correspond to, for example, a memory, a register bank, a communication interface, a timer circuit, a cryptography circuit, and the like.

Embodiments of systems and methods for managing a resource allocation are disclosed herein. The disclosed embodiments may demonstrate improved methods for allocating resources quickly and efficiently.

A block diagram of an embodiment of processor core is illustrated in FIG. 1. In various embodiments, Core 100 may correspond to a core in a general-purpose processor, a communications processor, an audio processor, and the like. In the illustrated embodiment, Core 100 corresponds to a graphics processor capable of performing various tasks to prepare data related to an image for display, including tasks such as, for example, rendering and shading. Core 100 includes Allocation Control Circuit 101, Local Memory 102, and Execution Units 103a and 103b, collectively referred to as Execution Units 103.

Execution Units 103 may be homogeneous (e.g., two similar rending circuits) or heterogeneous (e.g., a rendering circuit and a shader circuit). To prepare the data related to the image for display, either of Execution Units 103 may utilize one or more shared resources, such as, for example, Local Memory 102. Local Memory 102 may correspond to a memory such as static random access memory (SRAM), dynamic random access memory (DRAM), a register file (i.e., a plurality of registers), or other suitable forms of data storage. In the illustrated embodiment, portions of Local Memory 102 may be allocated to various requestors, such as Execution Units 103, for example, as requested.

To utilize a shared resource, such as Local Memory 102 in the illustrated embodiment, an execution unit, such as Execution Unit 103a sends an allocation request to Allocation Control Circuit 101. The allocation request includes a size value that corresponds to, in various embodiments, a number of bytes, number of words, or number of blocks of Local Memory 102 to be allocated. In some embodiments, the size may be restricted one of a set of predefined sizes, e.g., one, two, three, or four blocks of Local Memory 102, in which each block may be any suitable number of memory bits. Allocation Control Circuit 101 may allocate Local Memory 102 in consecutive blocks, i.e., memory blocks with consecutive logical and/or physical addresses. Allocation Control Circuit 101 determines if a suitably sized range of consecutive blocks is available for allocation in Local Memory 102. Under certain conditions, memory fragmentation may occur. As used herein, "memory fragmentation" refers to when a memory has a number of blocks available, but the blocks are not consecutively addressed. Allocation Control Circuit 101 may not be capable of making an allocation if the Local Memory 102 is too fragmented and the allocation request may, therefore, remain buffered in Allocation Control Circuit 101. Unfulfilled allocation requests may be kept buffered until enough memory locations are "deallocated" (i.e., previously allocated memory locations made available after the requesting circuit, e.g., one of Execution Units 103, has completed the tasks that utilized the allocated memory blocks).

In the illustrated embodiment, to mitigate fragmentation of Local Memory 102, Allocation Control Circuit 101 utilizes a particular procedure for allocating available blocks. In other embodiments, an allocation request may be filled by allocating a first set of memory blocks that meet the size requirement. Allocation Control Circuit 101 implements a size-aligned algorithm for fulfilling allocation requests. As used herein, "size-aligned" refers to selecting sets of memory blocks with starting and ending memory addresses selected based on a size of the request. Rather than allocating a first available set of blocks that meet the size requirements, Allocation Control Circuit 101 identifies sets of blocks with starting addresses that correspond to multiples of the size of the allocation request. For example, if three memory blocks are requested, then Allocation Control Circuit 101 determines if the first three blocks in Local Memory 102 are available, and if not, then determine if the next set of three blocks, following the first three blocks, are available, and, if not, continue the determinations until either a suitable set of blocks is identified or the end of Local Memory 102 has been reached. If a suitable set of blocks is identified, then Allocation Control Circuit 101 allocates the identified blocks to the Execution Unit 103 that issued the request.

To track which blocks of Local Memory 102 are currently allocated and, therefore, unavailable for unfulfilled allocation requests, Allocation Control Circuit 101 utilizes Register 105. In the illustrated embodiment, a bit in Register 105 corresponds to a block of Local Memory 102. A value of '0' in a given bit of Register 105 may correspond to an available block and a value of '1' may, therefore, correspond to a currently used block, or vice versa. To identify an available set of blocks to fulfill an allocation request, Allocation Control Circuit 101 may determine if bits 0-2 of Register 105 are '0.' If not, then bits 3-5 are read, and then bits 6-8, and so forth until a suitable set of blocks are identified, or the end of Register 105 is reached. A size-aligned algorithm, as disclosed herein, may help to mitigate memory fragmentation by restricting the memory locations where allocations of various sizes may begin and end. When locations are deallocated, the likelihood that additional available blocks are adjacent to the just deallocated blocks may be increased, resulting in a larger available set of contiguous memory blocks.

Allocation Control Circuit 101 may use additional criteria for selecting a suitable set of blocks to allocate. In some embodiments, Allocation Control Circuit 101 may, in addition to using a size-aligned algorithm, prioritize selection of available memory blocks based on a total available number of blocks in a given set of contiguous blocks. For example, a first set of available contiguous blocks may include eight blocks in total, while a second set of available contiguous blocks may include four blocks in total. Assuming the four block set meets the size-alignment criteria, the four block set may have a higher priority for fulfilling allocation requests for sizes of one to four blocks, thereby leaving the eight block set available for requests of five to eight blocks. Such a prioritization of available memory blocks, when combined with the size-aligned algorithm may further mitigate memory fragmentation, creating a more efficient usage of shared resources.

In addition, Allocation Control Circuit 101 may be implemented primarily, or in some embodiments, entirely, using hardware circuits. A hardware implementation may allow for faster processing of allocation requests, thereby improving performance of Core 100. In the illustrated embodiment, for example, Allocation Control Register 101 selects one or more allocation requests to fulfill, determines if a suitable set of blocks is available for each selected request, and, where applicable, allocates the suitable sets to a corresponding Execution Unit 103 in a first clock cycle of System Clock Signal 120. In a subsequent clock cycle of System Clock Signal 120, Allocation Control Circuit 101 updates which blocks are available. The faster allocation requests are fulfilled, the sooner one of Execution Units 103 may be able to use the allocated resource, and therefore, the sooner the shared resource may be deallocated and made available for another Execution Unit 103 or other processor in Core 100. Additional details of the allocation process and circuits are provided below in regards to FIG. 2.

It is noted that, to improve clarity and to aid in demonstrating the disclosed concepts, the block diagram of Core 100 has been simplified. In other embodiments, different and/or additional circuit blocks and different configurations of the circuit blocks are possible and contemplated. For example, although two execution units are illustrated, any suitable number of execution units may be included.

Figure 2:
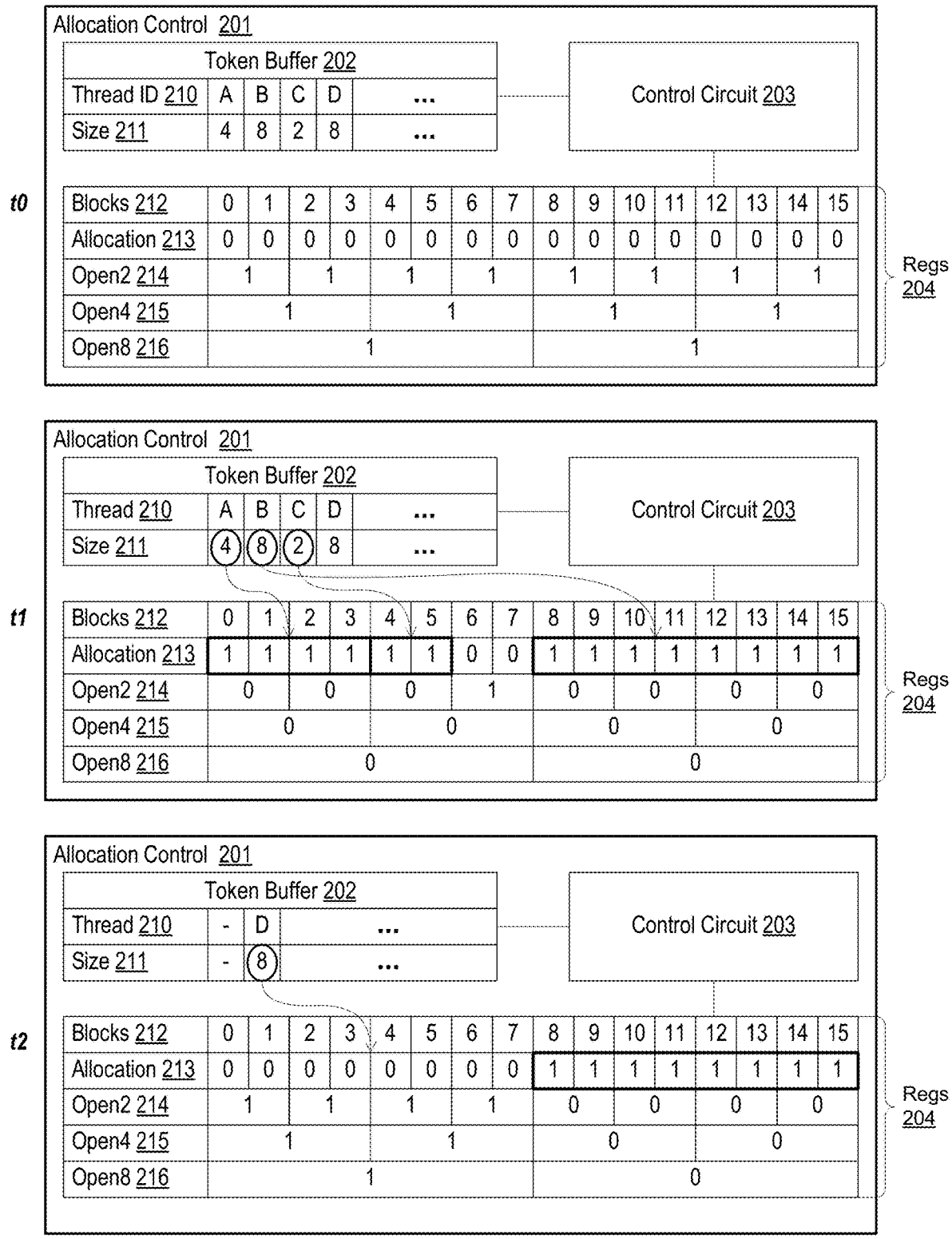
FIG. 2 shows a block diagram of an embodiment of an allocation controller, shown at three different points in time.

Turning to FIG. 2, a block diagram of an embodiment of an allocation controller, shown at three different points in time is shown. Three views of Allocation Control Circuit 201 are illustrated, each corresponding to a different point in time. In some embodiments, Allocation Control Circuit 201 may correspond to Allocation Control Circuit 101 in FIG. 1. As shown, Allocation Control Circuit 201 includes Token Buffer 202, Control Circuit 203, and Registers 204.

In the illustrated embodiment, Allocation Control Circuit 201 receives allocation requests in the form of tokens, that are then stored in Token Buffer 202 until the allocation request is fulfilled. Once a request is fulfilled, the corresponding token may be cleared from Token Buffer 202, freeing an entry for a new allocation request token. Each token may include at least a Thread ID 210 that identifies a software process or thread that will utilize the allocated resource blocks, and Size 211 that indicates a number of blocks to be allocated. Threads may be used to track allocated blocks, rather than execution units, as execution units may be capable of executing multiple software threads in parallel. In some embodiments, allocation tokens may be prioritized based on Thread ID 210, and a given execution unit may be processing a high priority thread in parallel with a lower priority thread. Priority may be given the high priority thread over the lower priority thread.

Registers 204 include four bit vectors: Allocation Vector 213, Open2 Vector 214, Open4 Vector 215, and Open8 Vector 216. Blocks 212, in the illustrated embodiment, does not represent a physical register, but instead is included in FIG. 2 to illustrate a mapping between data bits of the bit vectors to sixteen resource blocks to be allocated, such as, for example, sixteen memory blocks located in Local Memory 102 in FIG. 1. In some embodiments, however, a register to map various resources to the bit vectors may be included. Allocation Vector 213 includes 16 bits, but may include any suitable number of bits in other embodiments. Each bit of Allocation Vector 213 corresponds to one of the sixteen blocks of Blocks 212. A value of '0' in a particular bit of Allocation Vector 213 indicates that the corresponding block of Blocks 212 is available, while a value of '1' indicates the corresponding block of Blocks 212 is unavailable. Values in Open2 Vector 214, Open4 Vector 215 and Open8 Vector 216 are used to track availability of various sets of Blocks 212. Each of the eight bits of Open2 Vector 214 indicate if a corresponding set of two of the sixteen blocks of Blocks 212 is available. For example, a first bit of Open2 214 is set to '1' if both of blocks 0 and 1 of Blocks 212 are available, and is set to '0' if either block 0 or block 1 is unavailable. Open4 Vector 215 similarly includes four bits that indicate if sets of four of the sixteen blocks of Blocks 212 are available, while Open Vector 216 includes two bits to indicate if either of the sets of eight blocks of Blocks 212 is available.

Control Circuit 203, in the illustrated embodiment, manages the reception of allocation tokens and for each token, uses Registers 204 to determine if a suitable set of blocks is available. Control Circuit 203 allocates the suitable set of blocks, if available, to the thread indicated by Thread ID 210. In addition, Control Circuit 203 updates Allocation Vector 213 based on allocation tokens fulfilled and deallocation requests received from various execution units.

At time t0, Token Buffer 202 includes four tokens. All bits of Allocation Vector 213 are clear, indicating that all sixteen blocks of Blocks 212 are available. Since all sixteen blocks are available, all bits of Open2 Vector 214, Open4 Vector 215, and Open8 Vector 216 are set to '1' to indicate that sets of blocks of the corresponding sizes are all available.

At time t1, tokens for threads A, B, and C of Thread ID 210 have been fulfilled. Blocks 0-3 are allocated to thread A, blocks 4-5 are allocated to thread C, and blocks 8-15 are allocated to thread B. In various embodiments, the three allocations may occur in parallel or in series. It is noted that, due to the size-aligned algorithm, the eight blocks allocated to thread B start at block 8 rather than at block 6. Control Circuit 203 updates registers 204 based on the fulfilled allocations. Only blocks 6 and 7 of Blocks 212 are available, and therefore, no sets of four or eight blocks are available, as shown by the '0' values now in all bits of Open4 Vector 215 and Open8 Vector 216. Open2 Vector 214 indicates that the only set of two available blocks is blocks 6 and 7. The allocation token for thread D, therefore, must wait until a sufficient number of blocks are deallocated.

At time t2, threads A and C have completed their respective use of blocks 0-3 and blocks 4-5 and have, therefore, deallocated these blocks to make them available for other allocation requests. Blocks 8-15 remain allocated to thread B. The deallocation of blocks 0-5 combined with the continued availability of blocks 6 and 7 creates an available set of eight blocks, as indicated by the corresponding value of '1' in Open8 Vector 216. Control Circuit 203 may, therefore, allocate blocks 0-7 to thread D. It is noted that, although only six blocks were deallocated, a set of eight available blocks was created. If the eight blocks allocated to thread B had started with block 6, then a set of eight consecutive blocks would not have been created by the deallocation of the six blocks. By size aligning the request from thread B to begin at block 8, the set of blocks 0-7 were available upon the deallocations by threads A and C.

It is also noted that the embodiment of FIG. 2 is merely an example. The illustration of FIG. 2 has been simplified to highlight features relevant to this disclosure. Various embodiments may include different configurations of the circuit blocks, and different numbers of resource blocks and corresponding different sizes of bit vectors. Bit vectors are shown for block sizes of two, four, and eight blocks. In other embodiments, additional bit vectors may be included for other block sizes, such as, for example, three, five, six, and/or seven blocks.

Figure 3:
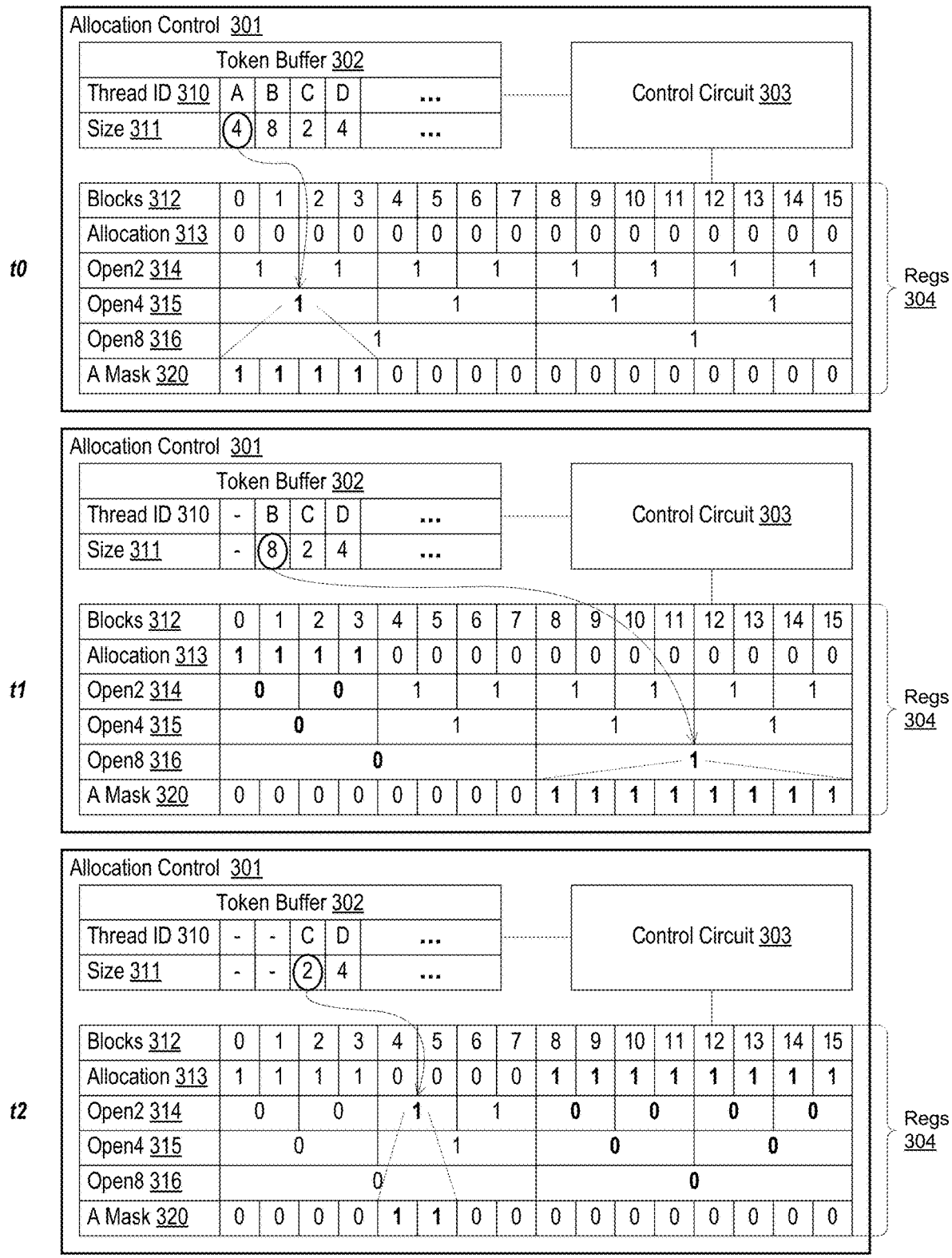
FIG. 3 depicts a block diagram of another embodiment of an allocation controller, also shown at three different points in time.

An example of updating an allocation vector is depicted in FIG. 3. The illustrated embodiment of FIG. 3 shows Allocation Control Circuit 301 which corresponds to Allocation Control Circuit 201 from FIG. 2. Allocation Control Circuit 301 includes Token Buffer 302, Control Circuit 303, and Registers 304. Token Buffer 302 and Control Circuit 303 operate in accordance with the descriptions disclosed above, with exceptions and additions described below. Registers 304 operate similar to the description provided for Registers 204, with a noted addition of Allocation Mask (A Mask) 320. In the illustrated embodiment, Allocation Mask 320, like Allocation Vector 313, includes sixteen bits, each bit corresponding to a bit in Allocation Vector 313. Three views of Allocation Control Circuit 301 are shown, each representing a different point in time.

At time t0, the bit values for Allocation Vector 313 are all '0,' indicating that all sixteen blocks of Blocks 312 are available. A first allocation token from Token Buffer 302 is selected, requesting four blocks for thread A. Using Open4 Vector 315, Control Circuit 303 allocates blocks 0-3 to thread A. In response to the allocation, Control Circuit 303 also sets corresponding bits in Allocation Mask 320 to '1.'

At time t1, Allocation Mask 320 is used to update Allocation Vector 313, which also results in updates to Open2 Vector 314, Open4 Vector 315, and Open8 Vector 316. Data bits in Open2 Vector 314 and Open4 Vector 315 that correspond to blocks 0-3 are set to '0' to indicate that these sets of blocks are currently unavailable for allocation. Since a size-aligned process is utilized, a bit in Open8 Vector 316 that corresponds to blocks 0-7 is also cleared to indicate that these blocks are not available for an allocation of eight blocks, despite blocks 4-7 being available. Also at time t1, Control Circuit 303 selects the token for thread B, requesting eight blocks, for a next allocation. Using Open8 Vector 316, Control Circuit 303 selects blocks 8-15 for thread C, since blocks 0-7 are unavailable for an eight block allocation. Again, Control Circuit 303 sets corresponding bits in Allocation Mask 320 based on this allocation. The bits corresponding to blocks 0-3 are cleared and bits corresponding to blocks 8-15 are set. Between times t1 and t2, At time t2, as described above, Allocation Mask 320 is used to update Allocation Vector 313, which also results in updates to Open2 Vector 314, Open4 Vector 315, and Open8 Vector 316. Blocks 4-7 remain available as indicated by the values of '0' in the corresponding bits in Allocation Vector 313. Accordingly, Open2 Vector 314 indicates two available sets of two blocks and Open4 Vector 315 indicates a single available set of four blocks. Control Circuit 303 selects a token for thread C, requesting two blocks, and using Open2 Vector 314, allocates blocks 4 and 5 to thread C. Control Circuit 303 again sets bits in Allocation Mask 320 corresponding to the allocated blocks, clearing bits corresponding to blocks 8-15 and setting bits corresponding to block 4 and block 5.

In the illustrated embodiment, the time between t0 and t1, as well as the time between t1 and t2, may each correspond to a single cycle of a clock signal, such as, for example, System Clock Signal 120 in FIG. 1. Control Circuit 303 may include combinational logic gates configured to perform the described operations. The updating of Allocation Mask 320, as well as the vectors in Registers 304 may also be performed by logic gates, and therefore, be capable of updating values between successive cycles of System Clock Signal 120. A pipelined operation may be implemented that allows Control Circuit 303 to process a second allocation token, while in parallel, Allocation Masks 320 and Registers 304 are updated based on results from a first allocation token. Thus, in some embodiments, a pipelined system for performing fast, efficient resource allocations is enabled.

It is noted that the circuits described in FIG. 3 are merely examples of an allocation controller. Various embodiments may include different circuit blocks. FIG. 3 is not intended to illustrate a physical arrangement or relative sizes of the illustrated circuit blocks. Additional registers, as well as various sizes of registers, may be implemented in other embodiments.

Figure 4:
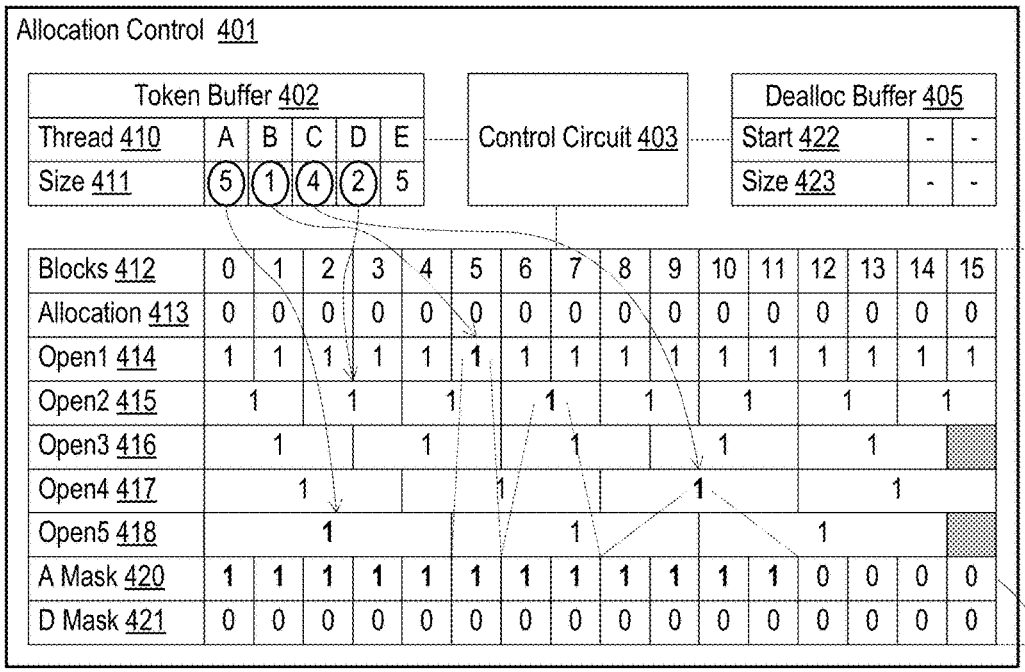
FIG. 4 illustrates a block diagram of another embodiment of an allocation controller, shown at two different points in time.
Figure 4:
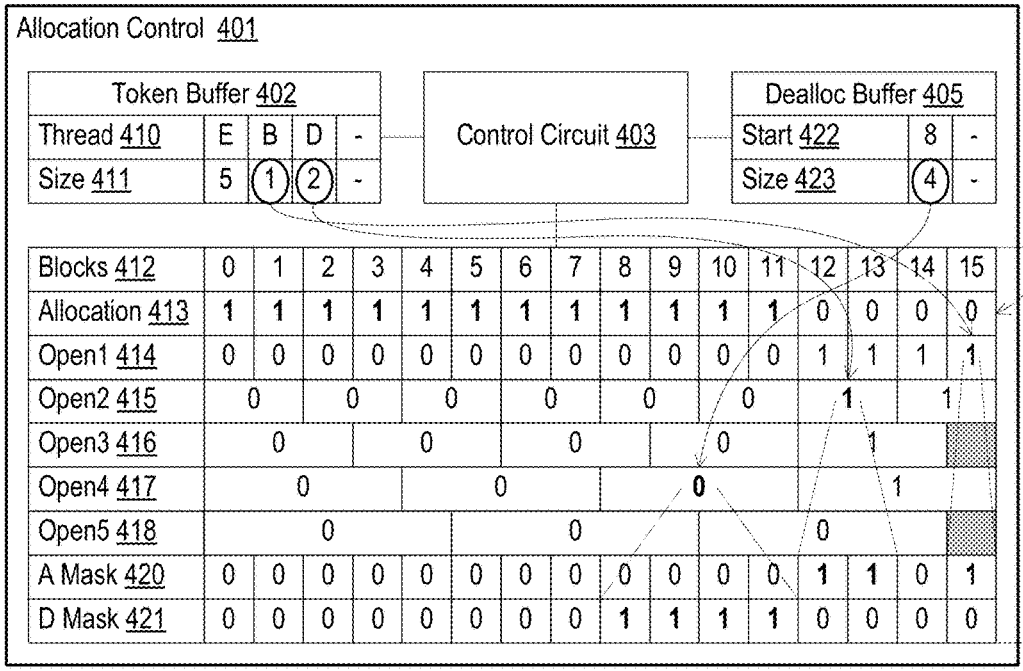

The example of FIG. 3 depicted memory allocations occurring in series. Turning now to FIG. 4, an example of memory allocations occurring in parallel is illustrated. In addition, FIG. 4 shows an example of memory deallocations in parallel with allocations. FIG. 4 shows two views of Allocation Control Circuit 401, which may correspond to, for example, Allocation Control Circuit 101 in FIG. 1. Allocation Control Circuit 401 includes Token Buffer 402, Control Circuit 403, Registers 404, and Deallocation (Dealloc) Buffer 405. The two views illustrate Allocation Control Circuit 401 at two different points in time.

In the illustrated embodiment, Token Buffer 402 and Control Circuit 403 correspond to Token Buffer 202 and Control Circuit 203 from FIG. 2, and the preceding descriptions of these circuits apply to FIG. 4, with exceptions and additions as described below. Registers 404 is similar to Register 204 or Registers 304 in FIGS. 2 and 3 respectively. In FIG. 4, however, a different set of bit vectors is included. Registers 404 include Allocation Vector 413 with sixteen data bits corresponding to sixteen memory blocks as indicated by Blocks 412. Similar to Allocation Vectors 213 and 313 in FIGS. 2 and 3, respectively, each bit of Allocation Vector 413 is set to '0' to indicate an available memory block, or to '1' to indicate an unavailable block. Open1 Vector 414 also includes sixteen bits to indicate availability of each block of Blocks 412. In some embodiments, Allocation Vector 413 may be used as Open1 Vector 414. In the illustrated embodiment, a separate register is used with the values of the bit reversed from Allocation Vector 413, i.e., a value of '1' indicates an available or open block, while a value of '0' indicates an unavailable block. Other bit vectors included in Registers 404 include Open2 Vector 415, Open3 Vector 416, Open4 Vector 417, and Open5 Vector 418. Each of these bit vectors includes a number of data bits corresponding to respective sets of available consecutive blocks of Blocks 412. For example, each of the five bits of Open3 Vector 416 corresponds to an availability of a set of three consecutive blocks. It is noted that both Open3 Vector 416 and Open5 Vector 418 do not have a bit to represent block 15. In other embodiments, the unmapped block may correspond to any of the blocks of Blocks 412, such as block 0 or block 3, for example.

Registers 404 also includes two masks, Allocation Mask (A Mask) 420 and Deallocation Mask (D Mask) 421. Allocation Mask 420, in the illustrated embodiment, corresponds to Allocation Mask 320 of FIG. 3. Deallocation Mask 421 is similar to Allocation Mask 420, except it is used to create a mask for updating deallocated blocks, rather than allocated blocks, in Allocation Vector 413.

FIG. 4 also includes Deallocation Buffer 405 to receive deallocation requests from execution units that have completed their use of previous allocated blocks of Blocks 412. In the illustrated embodiment, Deallocation Buffer 405 receives tokens that include values such as Start 422 that corresponds to the first block of the set to be deallocated and Size 423 that corresponds to the number of blocks in the set to be deallocated. In other embodiments, other types of information may be received to indicate the blocks to be deallocated.

At time t0, all bits of Allocation Vector 413 are clear, indicating that all blocks of Blocks 412 are available for allocation. Accordingly, all bits of the bit vectors Open1 Vector 414 through Open5 Vector 418 are set to indicate the corresponding sets of blocks are, likewise, available for allocation. Control Circuit 403 determines that of the five allocation tokens in Token Buffer 402, the tokens for threads A, B, C, and D may be fulfilled in the current cycle. The token for thread E is not fulfilled in this cycle due to a lack of available blocks for all tokens. It is noted that any combination of various criteria for selecting the tokens to fulfill in a particular cycle may be employed. Arbitration criteria may include, for example, relative priorities of the requesting threads, the sizes of requests, an order in which the tokens were received, and the like.

Once the tokens to process in the current cycle are selected, Control Circuit 403 may fulfill the allocations in order of the request size, allocating blocks 0-5 to thread A first, and then blocks 8-11 to thread C next. Control Circuit 403 may then allocate blocks 6 and 7 to thread D due to the smaller available space between allocated block 4 and block 8, leaving the larger space of blocks 12-15 open. Control Circuit 403 then allocates block 5 to thread B for a similar reason. Bits of Allocation Mask 420 corresponding to the just allocated blocks are set to a value of '1' to indicate that these blocks will not be available in the next cycle.

At time t1, Allocation Vector 413 is updated based on Allocation Mask 420 and the bit vectors Open1 Vector 414 through Open5 Vector 418 update based on updated Allocation Vector 413. Since no sets of five consecutive blocks are available, all bits of Open5 Vector 418 are set to '0.' Bits for Open1 Vector 414, Open 2 Vector 415, Open3 Vector 416, and Open4 Vector 417 that map to blocks 12-15 remain at a value of '1' to indicate their availability. Other bits of these vectors are set to '0' to indicate unavailability of the corresponding blocks.

Since Open5 Vector 418 does not indicate an available set of five blocks, the token for thread E remains in Token Buffer 402 for another cycle. Tokens for threads B and D, however, are determined to have available blocks. Blocks 12 and 13 may be assigned to thread D, while block 15 is assigned to thread B. In some embodiments, block 15 may have a higher priority for a set size of one block since block 15 is not used for sets of size three and size five. In addition to fulfilling the tokens for threads B and D, Control Circuit 403 receives a deallocation request from thread C that releases four blocks, starting with block 8. Control Circuit 403 updates Allocation Mask 420 based on the two fulfilled allocations and updates Deallocation Mask 421 based on the deallocation request in Deallocation Buffer 405.

In the illustrated embodiment, similar to the embodiment of FIG. 3, the time between t0 and t1 may correspond to a single cycle of a clock signal, such as System Clock Signal 120 in FIG. 1, for example. Combinational logic gates may be utilized to create Control Circuit 403 and other circuitry used to update the various bit vectors in Registers 404. It is also noted that any suitable method may be employed to update Allocation Vector 413 using Allocation Mask 420 and Deallocation Mask 421. For example, in some embodiments, exclusive OR logic gates may be used to toggle bit values in Allocation Vector 413, while in other embodiments, set-reset flip-flop circuits may be used with Allocation Mask 420 coupled to the set inputs and Deallocation Mask 421 coupled to the reset inputs.

It is noted that Allocation Control Circuit 401 of FIG. 4 is merely an example. Various numbers of bit vectors may be utilized in other embodiments, as well as a different number of resource blocks. In various embodiments, buffer sizes for token buffers and deallocation buffers may be any suitable size.

Figure 5:
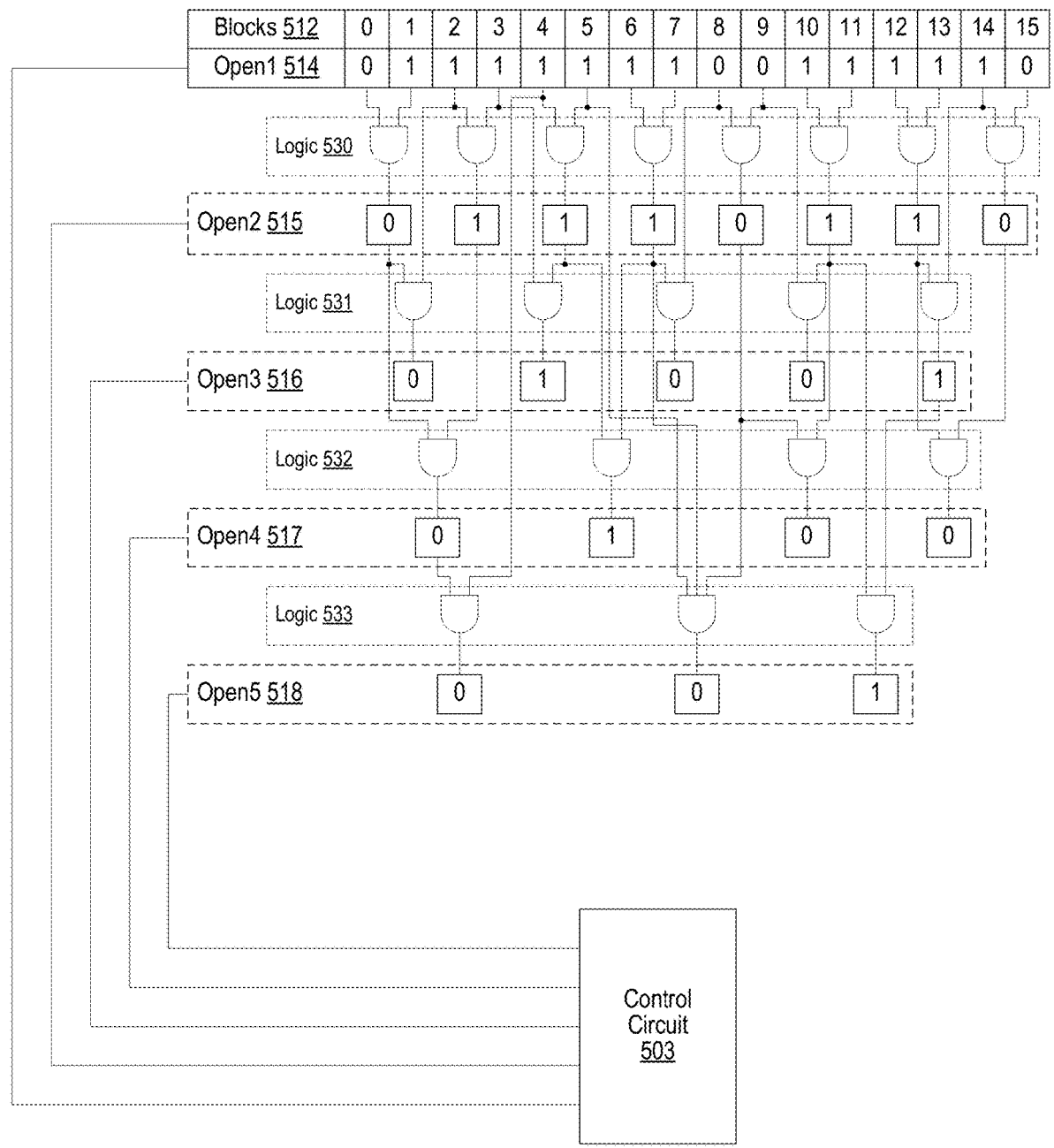
FIG. 5 shows a block diagram of a circuit for determining resource availability for various-sized resource blocks.

Moving now to FIG. 5, a block diagram for an embodiment of circuits to determine availability for various-sized sets of resource blocks is shown. The illustrated circuit includes five bit vectors: Open1 Vector 514, Open2 Vector 515, Open3 Vector 516, Open4 Vector 517, and Open5 Vector 518. Data bits in the five bit vectors are mapped to the resource blocks indicated by Blocks 512. The five bit vectors are coupled to Control Circuit 503. Four groups of logic circuits, namely Logic Circuits 530-533, are used to determine values stored in at least some of the bit vectors. The circuits of FIG. 5 may, in some embodiments, correspond to circuits included in Registers 404 in FIG. 4. Similarly, Control Circuit 503 may correspond to Control Circuit 403 in FIG. 4.

In the illustrated embodiment, data bits in each of the five bit vectors correspond to one or more resource blocks as indicated by Blocks 512. In various embodiments, Blocks 512 may correspond to data values in one or more registers or memory locations, or to hard-coded links to the corresponding resource block. A value of '1' in a particular bit of Open1 Vector 514 indicates that a corresponding resource block indicated by Blocks 512 is available for allocation by Control Logic 503, while a value of '0' indicates that the corresponding resource block is not available. In other embodiments, the polarity of the values may be reversed. A particular bit of Open2 Vector 515 corresponds to two consecutive blocks of Blocks 512, one bit of Open3 Vector 516 corresponds to three consecutive resource blocks of Blocks 512, and so forth through Open5 Vector 518.

Logic Circuits 530-533, in the illustrated embodiment, are used to determine the values in Open2 Vector 515 through Open5 Vector 518, based on values stored in Open1 Vector 514. In some embodiments, Open1 Vector 514 may correspond to an allocation vector such as Allocation Vector 413 in FIG. 4, while in other embodiments, values in Open1 Vector 514 may be determined based on values in a separate allocation vector. Although Logic Circuits 530-533 are shown as including various pluralities of AND logic gates, in other embodiments, any suitable circuits, including other types of logic gates, may be employed.

Logic Circuit 530, as shown, includes a respective AND gate with input terminals coupled to consecutive sets of two bits of Open1 Vector 514, and an output terminal coupled to a respective bit of Open2 Vector 515. If both corresponding bits of Open1 Vector 514 have values of '1' to indicate the corresponding blocks of Blocks 512 are available, then the respective data bit of Open2 Vector 515 is set to '1,' indicating that a set of two consecutive blocks is available. Otherwise, if one or both of the bits of Open1 Vector 514 have a value of '0,' then the respective data bit of Open2 Vector 515 is '0' thereby indicating that the corresponding set of two blocks is not available. In the illustrated example, three bits of Open2 Vector 515 are set to '0' based on the respective bits of Open1 Vector 514.

Logic Circuit 531, in the illustrated embodiment, similarly utilizes AND gates with input terminals coupled to a combination of data bits of Open1 Vector 514 and Open2 Vector 515 and with output terminals coupled to respective bits of Open3 Vector 516. AND gates in Logic Circuits 532 and 533 are likewise coupled to suitable combinations of data bits of the five bit vectors to determine the availability of the corresponding sets of consecutive resources. Values of data bits in Open4 Vector 517 are determined based on Logic Circuit 532 and values for data bits of Open5 Vector 518 are similarly determined by Logic Circuit 533. In some embodiments, bit vectors Open1 Vector 514 through Open5 Vector 518 may utilize storage circuits that are updated based on an active transition of a clock signal, such as, for example, a flip-flop circuit or other data latching circuit. In other embodiments, a first bit vector, such as, e.g., Allocation Vector 413 in FIG. 4 or Open1 Vector 514, may utilized clocked storage circuits, while the remaining bit vectors may correspond to the output nodes of a respective one of Logic Circuits 530 through 533. In such other embodiments, if, for example, a value of Open1 Vector 514 is latched at a first clock transition, then values for Open2 Vector through Open5 Vector 518, if not latched, may update based on changes to Open1 Vector 514 before a subsequent second clock transition, thereby resulting in updated values for all bit vectors Open1 Vector 514 through Open5 Vector 518 by the second clock transition.

The values of the bit vectors Open1 Vector 514 through Open5 Vector 518 are, in the illustrated embodiment, sent to Control Circuit 503. Control Circuit 503, as has been described above, identifies a suitable set of available resource blocks from Blocks 512 based on the values of Open1 Vector 514 through Open5 Vector 518. In some embodiments, to increase an efficiency of resource allocations, Control Circuit 503 may assign a priority to an available set of blocks. This priority may be based on a largest sized set of available blocks within which a particular available block is included. For example, in FIG. 5, block 1 is available as a single resource block, but, due to the unavailability of block 0, is not available as a set of two through a set of five, as indicated by the corresponding bits in Open2 Vector 515 through Open5 Vector 518. Block 1, therefore, may be prioritized when a request for a single resource block is received.

Continuing the example illustrated in FIG. 5, Open2 Vector 515 indicates five sets of two available resource blocks. Of these five available sets of two, blocks 2 and 3 may be prioritized despite block 3 also being included in a set of three consisting of blocks 3, 4, and 5. Available blocks 4 and 5, as well as blocks 6 and 7 collectively form a set of four available blocks, as indicated by Open4 Vector 517. Similarly, available blocks 10 and 11 as well as blocks 12 and 13 are included in a set of five as indicated by Open5 Vector 518. Since the available sets of four and five are larger than the set of three that includes block 3, resource blocks 2 and 3 may be the highest priority set of two available blocks.

Similar criteria may be used to prioritized blocks 3, 4, and 5 as the highest priority set of three blocks. Blocks 4 and 5 are included in the one available set of four blocks. The other available set of three blocks, however, includes blocks that are included in the one available set of five blocks.

In some embodiments, additional criteria may be used to prioritize and select suitable resource blocks. For example, priorities may be adjusted based on currently buffered allocation requests. If a buffer, such as, e.g., Token Buffer 402 in FIG. 4, currently includes request tokens for sizes of four and three, but no requests for a size of five, then the priority for a set of three blocks may shift to blocks 12 through 14, allowing blocks 4 and 5 to be utilized for the allocation of the one available set of four blocks, including blocks 4-7. Other additional criteria may include relative priorities of each request token or an order in which the tokens are processed by Control Circuit 503.

It is noted that FIG. 5 is an example for demonstrating the disclosed embodiments. In other embodiments, different numbers of bit vectors may be included. Various other embodiments may include any suitable number of resource blocks.

Figure 6:
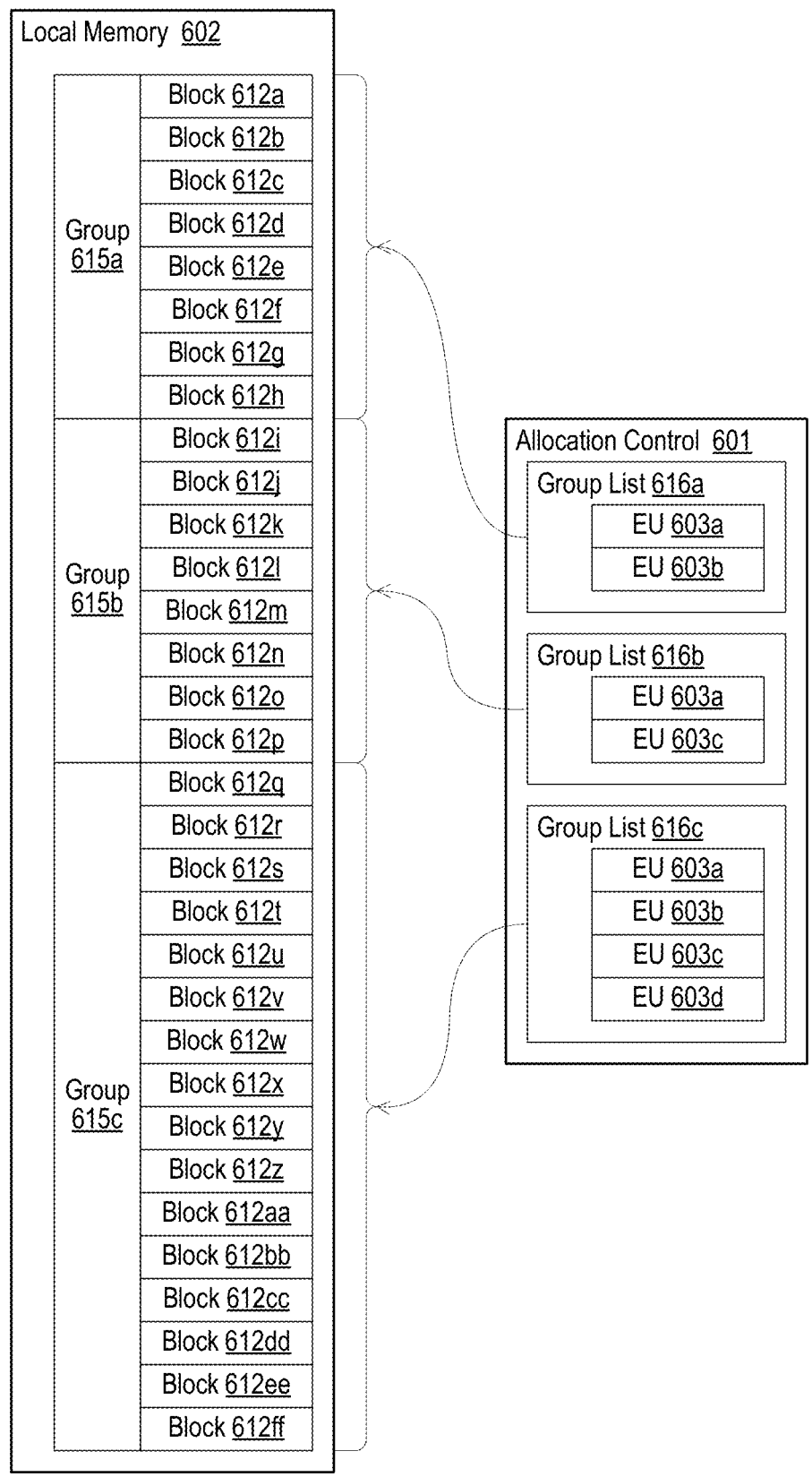
FIG. 6 shows a block diagram of a local memory and an allocation controller that limits allocations to particular groups of the memory locations in the local memory.

Turning to FIG. 6, another criterion for selecting resource blocks for allocation is shown. FIG. 6 illustrates a block diagram that includes Local Memory 602 and Allocation Control Circuit 601. In the illustrated embodiment, Allocation Control Circuit 601 limits allocations to particular groups of the memory blocks in Local Memory 602. In some embodiments, Allocation Control Circuit 601 and Local Memory 602 may correspond to Allocation Control Circuit 101 and Local Memory 102 in Core 100 of FIG. 1.

In the illustrated embodiment, Local Memory 602 includes 32 memory blocks that may be shared among a number of execution units. Allocation Control Circuit 601 maintains a grouping of the 32 blocks of Local Memory 602. Group 615a includes eight memory blocks, Blocks 612a-612h, Group 615b includes eight blocks, Blocks 612i-612p, and Group 615c includes sixteen blocks, Blocks 612q-612ff. Allocation Control Circuit 601 maintains a list of execution units permitted to use memory blocks in each of the three Groups 615. Group List 616a includes a list of execution units allowed to use the memory blocks in group 615a, which, in the illustrated example, corresponds to Execution Unit (EU) 603a and Execution Unit 603b. Similarly, Group List 616b indicates that Execution Units 603a and 603c are permitted to use blocks in Group 615b and Group List 616c includes Execution Units 603a-603d that are allowed to use the blocks of Group 615c.

Allocation Control Circuit 601, may, in some embodiments, allocate Blocks 612a-ff as described above for any of FIGS. 2-5. In addition, Allocation Control Circuit 601 limits allocations to Execution Units 603 based on the Groups 615 that a particular Execution Unit 603 is allowed to access. In the illustrated example, Execution Unit 603a is included in each of the three Group Lists 616, and therefore, request tokens from Execution Unit 603a may be fulfilled by any suitable set of Blocks 612 that are available. In this example, however, Execution Unit 603c is restricted from using Blocks 612a-612h, and instead, an available set of blocks from Group 615b and/or Group 615c are allocated. If available sets of blocks are prioritized, as described above, and the highest prioritized available set includes blocks from a restricted Group 615, then the request token is fulfilled using a highest prioritized set from the allowed Groups 615b and 615c.

Group assignments for the Execution Units 603 may be based on any suitable criteria. For example, Execution Units 603 may assign to Groups 615 based on a priority assigned to each Execution Unit 603, a function performed by each Execution Unit 603, a typical memory usage of each Execution Unit 603, or any other suitable criteria. In some embodiments, group assignments of Execution Units 603 may be hard-wired by a design of Allocation Control Circuit 601. In other embodiments, Allocation Control Circuit 601 may determine group assignments dynamically, or receive assignments from another processor in Core 100.

It is noted that FIG. 6 is merely an example. Although the memory blocks are shown to be assigned to one of three groups, in other embodiments, any suitable number of groups may be utilized. In addition, in some embodiments, a particular memory block may be assigned to more than one group.

Figure 7:
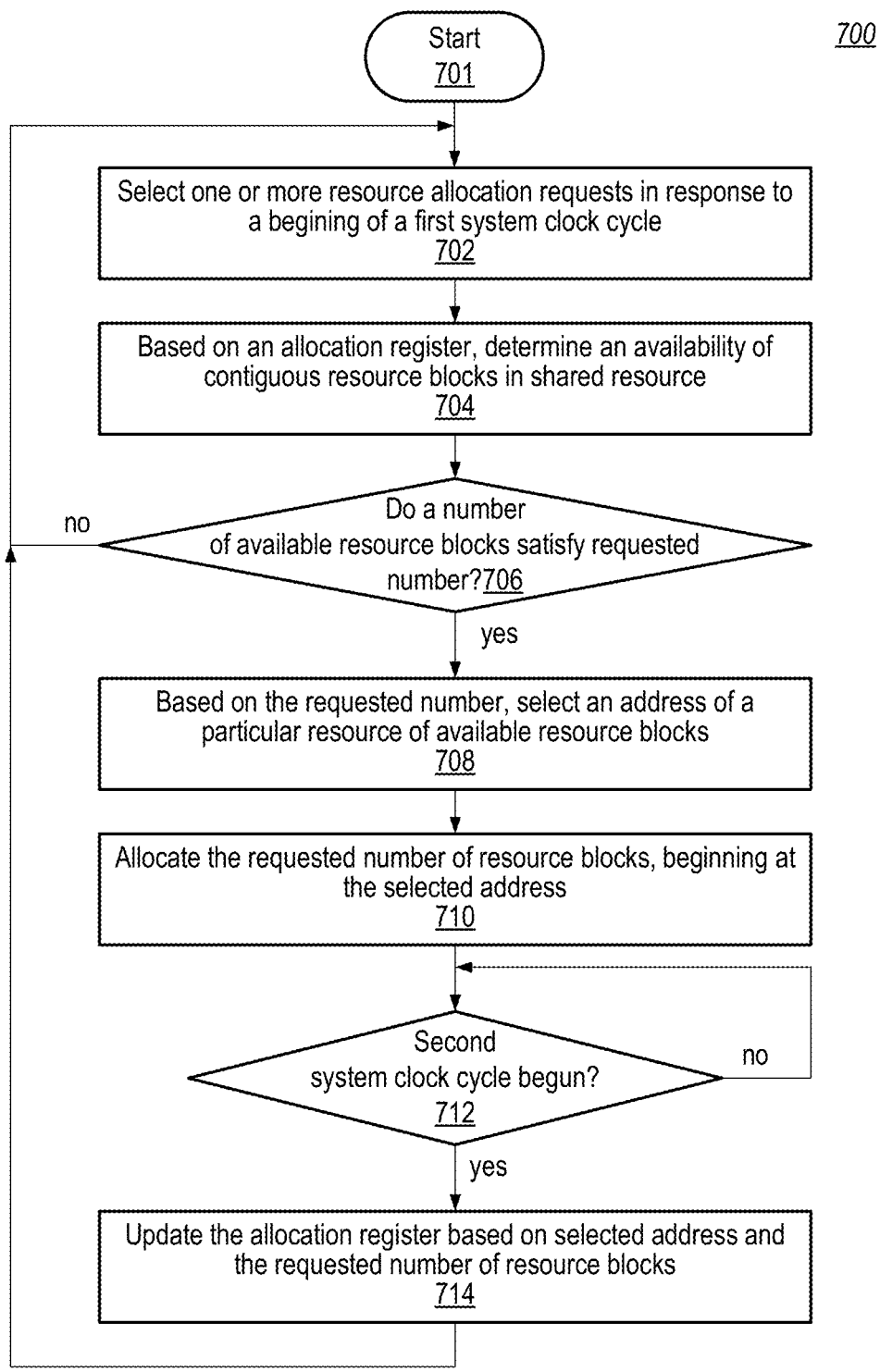
FIG. 7 illustrates a flow diagram of an embodiment of a method for allocating resource blocks.

Moving to FIG. 7, a flow diagram of an embodiment of a method for allocating resource blocks is illustrated. Method 700 may be applied to an allocation controller, such as, for example, Allocation Control Circuit 101 in FIG. 1 or Allocation Control Register 201 in FIG. 2. Referring collectively to FIG. 2 and the flow diagram of FIG. 7, Method 700 begins in block 701.

An allocation request is selected in response to a beginning of a first system clock cycle (block 702). Allocation Control Circuit 201 selects an allocation request to process at a beginning of a first cycle of a clock signal, such as, e.g., System Clock Signal 120 in FIG. 1. In the illustrated embodiment, the allocation request corresponds to a request token in Token Buffer 202 in FIG. 2. The request tokens correspond to an allocation request for a particular number of consecutive blocks in a shared resource, such as, for example, Local Memory 102 in FIG. 1. Each request token may also correspond to one process thread running on an execution unit serviced by Allocation Control Circuit 201. In some embodiments, Allocation Control Circuit 201 may select more than one request token to process during a particular clock cycle.

An availability of at least one set of contiguous resource blocks is determined based on an allocation register (block 704). Allocation Control Circuit 201, in the illustrated embodiment, determines of a suitable set of resource blocks is available based on values of data bits in Allocation Vector 213. Each data bit of Allocation Vector 213 corresponds to a block of memory in Local Memory 102. In various embodiments, a block of memory may correspond to any suitable number of addressable memory locations. For example, a resource block may correspond to any of a byte of memory, a word of memory, 32 bytes of memory, or 1 kilobyte of memory.

Further operations of Method 700 may depend on a number of available contiguous resource blocks (block 706). To determine if a set of resource blocks of the appropriate size for the request token is available, Allocation Control Circuit 201, in the illustrated embodiment, may use one of bit vectors Open2 Vector 214, Open4 Vector 215, or Open8 Vector 216. Each of these bit vectors, or additional bit vectors that are not illustrated, are updated each cycle of System Clock Signal 120 to keep an accurate indication of available sets of resource blocks of various sizes. If, for example, the selected request token has a size of four, then Allocation Control Circuit 201 scans Open4 Vector 215 for a value indicating that a set of four consecutive resource blocks is available. If a set of the requested size is available, then the method moves to block 708 to select an address within the available set of blocks. Otherwise, the method returns to block 702 to select a nest request token at the start of a next clock cycle.

If a set of the requested size is available, then an address of a particular resource block is selected based on the requested number of resource blocks (block 708). Allocation Control Circuit 201 allocates resource blocks using a size-aligned process. In this size-aligned process, a starting address of consecutive sets of resource blocks may each be determined by a size of the request. For example, referring to Open4 Vector 215 in FIG. 2, a starting address for each of the four sets of four resource blocks corresponds to a multiple of four, i.e., block 0, block 4, block 8, and block 12. In this example, blocks 1, 2, or 3 may not be used as starting addresses. A physical address corresponding to block 0 may be any physical address as addresses for a particular shared resource may be assigned any suitable base address. Once a base address for block 0 is established, however, addresses for consecutive sets of four resource blocks increment by a delta corresponding to a size of four resource blocks. For example, if a physical address for block 0 is 0100, then an address for the next set of four blocks is four times the number of address in each block. If each block includes 8 addresses, then the next set of four blocks has an address of 0132, the following set has an address of 0164, and so forth. For allocations of three blocks, also starting with block 0, the first set begins at address 0100, the second set at address 0124, a third set at address 0148, etc.

The requested number of resource blocks is allocated beginning at the selected address (block 710). Each request token in Token Buffer 202 includes a value for Thread ID 210. When Allocation Control Circuit 201 identifies a suitable set of resource blocks for a particular request token, the identified set of blocks is allocated to the thread identified by the particular token. In the illustrated embodiment, an allocation mask, such as, for example, Allocation Mask 320 in FIG. 3, is utilized. As part of the allocation process, bits in Allocation Mask 320 are set to indicate the corresponding blocks of the allocated set are no longer available. If more than one request token is processed in the current clock cycle, then Allocation Mask 320 is updated for each request token that is fulfilled.

Subsequent operations of Method 700 may depend on a beginning of a second system clock cycle (block 712). One or more request tokens may be processed in a particular clock cycle. Each request token processed may be either fulfilled if an available set of blocks is identified, or maintained in Token Buffer 202 if a suitable set of blocks is not available. Upon a beginning of a next cycle of System Clock Signal 120, Allocation Vector 213 may be updated and one or more new request tokens may be selected from Token Buffer 202. If a next cycle has not started, then the method remains in block 712, and otherwise proceeds to block 714 for updates based on the fulfilled allocations.

If a beginning of a second clock cycle is detected, then the allocation register is updated based on the selected address and the requested number of resource blocks (block 714). In the illustrated embodiment, Allocation Mask 320 is updated as request tokens are fulfilled during the first clock cycle. At the beginning of a second clock cycle, Allocation Vector 213 is updated based on the Allocation Mask 320. In addition, bit vectors, such as, Open2 Vector 214, Open4 Vector 215, and Open8 Vector 216 may update as a new value of Allocation Vector 213 is generated, thereby generating updated indications of available blocks in Local Memory 102. Method 700 returns to block 702 to select new request tokens.

It is noted that the method illustrated in FIG. 7 is merely an example embodiment. Variations on this method are possible. Some operations may be performed in a different sequence, and/or additional operations may be included. Although a memory is used as the shared resource in the description of FIG. 7, any shared circuit that may access and allocated using consecutive addresses may correspond to the shared resource.

Figure 8:
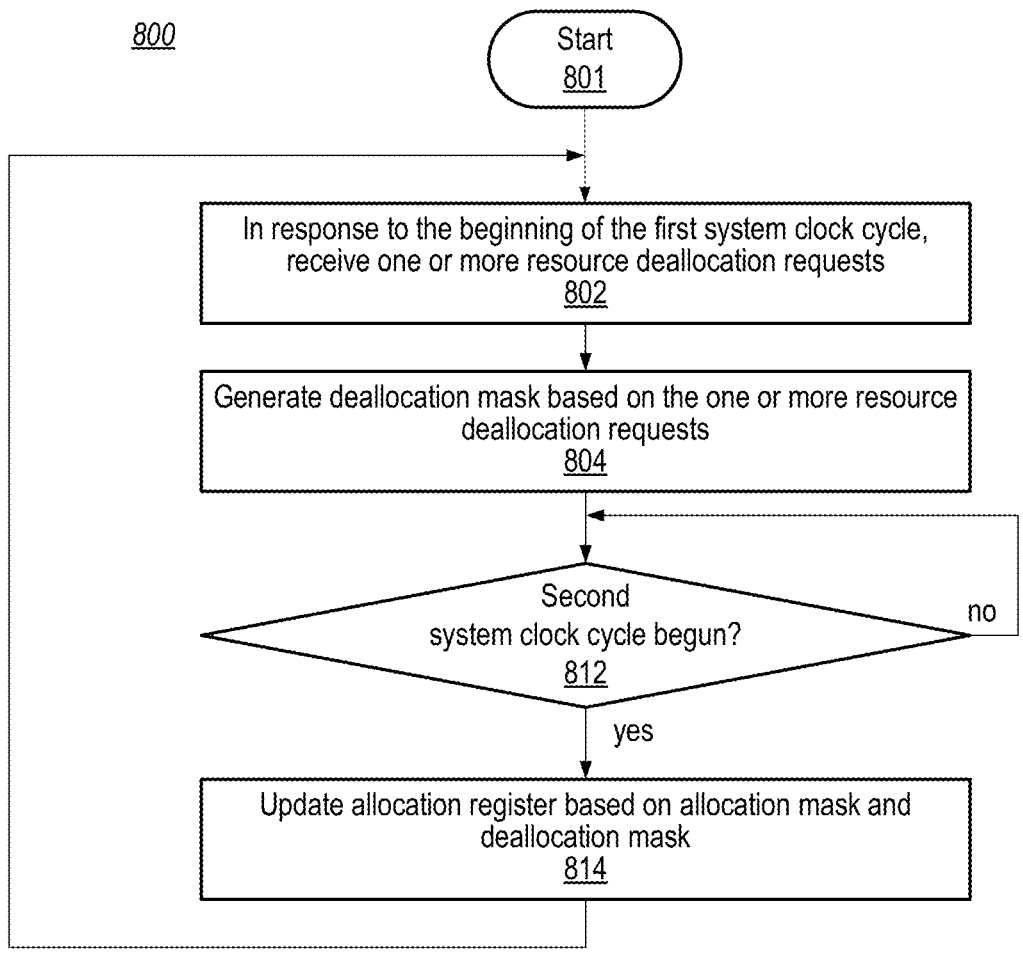
FIG. 8 depicts a flow diagram illustrating an embodiment of a method for deallocating resource blocks.

Turning now to FIG. 8, a flow diagram illustrating an embodiment of a method for deallocating resource blocks is shown. Method 800 may be applied to an allocation controller, such as, for example, Allocation Control Circuit 401 in FIG. 4, and may run concurrently with method 700 in FIG. 7. Referring collectively to FIG. 4 and the flow diagram of FIG. 8, the method may begin in block 801.

One or more resource deallocation requests are received (block 802). Allocation Control Circuit 401 receives one or more deallocation requests which are stored in Deallocation Buffer 405. As process threads running on any of various execution units in a system, such as, for example, Core 100 in FIG. 1, complete tasks associated with resource blocks that had previously been allocated, the respective process threads issue deallocation requests to Allocation Control Circuit 401 to make the resource blocks available for other threads. In the illustrated embodiment, Control Circuit 403 selects the one or more deallocation requests in response to a transition of a clock signal, such as System Clock Signal 120 in FIG. 1. In some embodiments, each deallocation request may include a base address, corresponding to a first block of allocated blocks, and a size value indicating a number of blocks included in the allocation. In other embodiments, an allocation table may be included in Allocation Control Circuit 101. In such embodiments, each deallocation request may correspond to an entry in the allocation table. An entry in the allocation table may include the base address and the size value. In the example of FIG. 4, one deallocation request is received with a start address of 8 (corresponding to block 8 in Blocks 412) and a size of 4 blocks.

A deallocation mask is generated based on the one or more resource deallocation requests (block 804). For each deallocation request received, bits in a deallocation mask, such as, e.g., Deallocation Mask 421, are set to a value indicating that the corresponding resource blocks are to be deallocated. In the example of FIG. 4, the received deallocation request causes Control Circuit 403 to set bits in Deallocation Mask 421 that correspond to blocks 8, 9, 10, and 11 of Blocks 412.

Continuing operations of Method 800 may depend on a detection of a beginning of a second clock cycle (block 812). In the illustrated embodiment, Control Circuit 403 responds to a transition of System Clock Signal 120 by updating an allocation vector based on the value of Deallocation Mask 421. If a beginning of a next clock cycle is detected, then the method moves to block 814 to update the allocation vector. Otherwise, Method 800 remains in block 812.

After a detection of the second clock cycle, the allocation register is updated based on the deallocation mask and an allocation mask (block 814). Allocation Vector 413 is updated based on the value of Deallocation Mask 421. In some embodiments, an allocation mask (i.e., Allocation Mask 420) may be combined with Deallocation Mask 421 to update Allocation Vector 413 in a single operation, while in other embodiments, the two masks may be utilized in separate operations. In some embodiments, Allocation Mask 420 and Deallocation Mask 421 may correspond to a single mask. In the illustrated embodiment, Allocation Mask 420 has a value of '1' in bits corresponding to blocks 12, 13, and 15, while Deallocation Mask 421 has a value of '1' in bits corresponding to blocks 8-11. Exclusive OR circuits may be utilized to cause the bits of Allocation Vector 413 that correspond to blocks 8-11 to toggle from values of '1' (indicating unavailable) to values of '0' (indicating available). Similarly, the bits of Allocation Vector 413 corresponding to blocks 12, 13, and 15 may be toggled from '0' to '1' to indicate that they have now been allocated. Upon completion of the update to Allocation Vector 413, Deallocation Mask 421, as well as Allocation Mask 420, is initialized and the method returns to block 802 to receive further deallocation requests.

It is noted that the method illustrated in FIG. 8 is an example for demonstrating the disclosed concepts. In other embodiments, operations may be performed in a different sequence. Additional operations may also be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   a plurality of execution units configured to generate a plurality of resource allocation requests, wherein requests of the plurality of resource allocation requests indicate a resource allocation size for that request;

a shared resource; and an allocation control circuit, including an allocation register, configured to:

in response to a first transition of a system clock signal, select a particular resource allocation request from the plurality of resource allocation requests;

determine an availability, based on a value stored in the allocation register, of one or more contiguous resource blocks within the shared resource;

in response to determining that a number of the one or more contiguous resource blocks satisfies a requested number of resource blocks, select, based on the requested number, an address corresponding to a particular resource block of the one or more contiguous resource blocks;

allocate the requested number of resource blocks, beginning at the selected address, to a corresponding execution unit of the plurality of execution units; and in response to a second transition of the system clock signal, immediately successive to the first transition, update the value stored in the allocation register based on the selected address and the requested number of resource blocks.

2. The system of claim 1, wherein, in response to second transition of the system clock signal, the allocation control circuit is further configured to select another resource allocation request from the plurality of resource allocation requests.

3. The system of claim 1, wherein to select, based on the requested number, the address of the particular resource block, the allocation control circuit is further configured to select an address that corresponds to a multiple of the requested number.

4. The system of claim 1, wherein the allocation control circuit is further configured to, based on a particular execution unit of the plurality of execution units that generated the selected resource allocation request, select an address from a subset of locations in the shared resource, wherein the subset is associated with the particular execution unit.

5. The system of claim 1, wherein, in response to the beginning of the first transition of the system clock signal, the allocation control circuit is further configured to select another resource allocation request from the plurality of resource allocation requests wherein the another resource allocation request is from another execution unit of the plurality of execution units.

6. The system of claim 5, wherein the allocation control circuit is further configured to:

in response to a determination that the number of the one or more contiguous resource blocks satisfies a second requested number of resource blocks in the another resource allocation request, select, based on the second requested number, an address of another resource block of the one or more contiguous resource blocks; and allocate the second requested number of resource blocks, beginning at the address of the another resource block, to the another execution unit.

7. The system of claim 6, wherein to update the value of the allocation register, the allocation control circuit is further configured to determine a mask value based on the selected address, the requested number of resource blocks, the address of the another resource block, and the second requested number of resource blocks.

8. A method, comprising:

in response to a first transition of a system clock signal, selecting, by an allocation control circuit, one or more resource allocation requests generated by at least one corresponding execution unit of a plurality of execution units;

determining an availability, based on a value stored in an allocation register, of one or more contiguous resource blocks within a shared resource;

in response to determining that a number of the one or more contiguous resource blocks satisfies a respective requested number of resource blocks for each of the one or more resource allocation requests, selecting, based on the requested number, a respective address of a particular resource block of the one or more contiguous resource blocks; and allocating the respective requested number of resource blocks, beginning at the selected respective address, to the corresponding execution unit of the plurality of execution units; and in response to a second transition of the system clock signal, occurring one cycle of the system clock signal after the first transition, updating the value of the allocation register based on the selected respective address and the respective requested number of resource blocks.

9. The method of claim 8, further comprising, in response to the second transition of the system clock signal, selecting another one or more resource allocation requests.

10. The method of claim 8, wherein selecting, based on the respective requested number, the respective address of the particular resource block comprises selecting an address that corresponds to a multiple of the requested number.

11. The method of claim 8, wherein updating the value of the allocation register comprises generating an allocation mask based on the selected respective address and the respective requested number of resource blocks.

12. The method of claim 11, further comprising:

in response to the first transition of the system clock signal, receiving, by the allocation control circuit, one or more resource deallocation requests from at least one execution unit of the plurality of execution units;

generating a deallocation mask based on the one or more resource deallocation requests; and in response to the second transition of the system clock signal, updating the value of the allocation register based on the allocation mask and the deallocation mask.

13. The method of claim 8, wherein determining the availability of the one or more contiguous resource blocks comprises:

generating, using the value stored in the allocation register, a respective available location bit vector for each of a plurality of contiguous resource block sizes; and using the respective available location bit vector corresponding to a size of a particular resource allocation request of the one or more resource allocation requests, determining that at least one address satisfies the respective requested number of resource blocks for the particular resource allocation request.

14. The method of claim 13, further comprising selecting a particular address from the at least one address based on other available location bit vectors that do not correspond to the size of the particular resource allocation request.

15. An apparatus, comprising:

a token buffer configured to receive one or more tokens from a plurality of graphics processing circuits;

an allocation register;

and a control circuit configured to:
- in response to a first transition of a system clock signal, select a particular token from the one or more tokens, wherein the particular token indicates a requested resource allocation size;
- determine an availability, based on a value stored in the allocation register, of one or more contiguous resource blocks within a shared resource;
- in response to determining that the one or more contiguous resource blocks satisfies the resource allocation size, select, based on the resource allocation size, an address corresponding to a particular resource block of the one or more contiguous resource blocks;
- allocate a number of resources blocks corresponding to the resource allocation size, beginning at the selected address, to the particular token; and
- in response to a second transition of a system clock signal, immediately successive to the first transition, update the value of the allocation register based on the selected address and the resource allocation size.

16. The apparatus of claim 15, wherein, in response to the second transition of the system clock signal, the control circuit is further configured to select another token from the one or more tokens.

17. The apparatus of claim 15, wherein to select, based on the resource allocation size, the address of the particular resource block, the control circuit is further configured to select an address that corresponds to a multiple of the number included in the particular token.

18. The apparatus of claim 15, wherein to select the particular token from the one or more tokens, the control circuit is further configured to select the particular token based on a priority assigned to a particular graphics processing circuit of the plurality of graphics processing circuits that generated the particular token.

19. The apparatus of claim 15, wherein to select the address of the particular resource block of the one or more contiguous resource blocks, the control circuit is further configured to select the particular resource block based on a priority assigned to the particular resource block.

20. The apparatus of claim 19, wherein to assign the priority to the particular resource block, the control circuit is further configured to assign a priority to a particular subset of continuous resource blocks based on a size of a set of continuous resource blocks that includes the particular subset.

* * * * *